(12) United States Patent
Chen et al.

(10) Patent No.: US 10,685,117 B2
(45) Date of Patent: Jun. 16, 2020

(54) METHOD AND APPARATUS FOR ANTI-REPACKAGING

(71) Applicant: Alibaba Group Holding Limited, George Town (KY)

(72) Inventors: Yaoguang Chen, Zhejiang (CN); Jiashui Wang, Zhejiang (CN)

(73) Assignee: Alibaba Group Holding Limited, George Town, Grand Cayman (KY)

( * ) Notice: Subject to any disclaimer, the term of this patent is extended or adjusted under 35 U.S.C. 154(b) by 0 days.

(21) Appl. No.: 16/381,857

(22) Filed: Apr. 11, 2019

(65) Prior Publication Data

US 2019/0243974 A1 Aug. 8, 2019

Related U.S. Application Data

(63) Continuation of application No. PCT/CN2017/103403, filed on Sep. 26, 2017.

(30) Foreign Application Priority Data

Oct. 11, 2016 (CN) .......................... 2016 1 0887188

(51) Int. Cl.
*G06F 21/16* (2013.01)
*G06F 21/64* (2013.01)
(Continued)

(52) U.S. Cl.
CPC .............. *G06F 21/566* (2013.01); *G06F 8/61* (2013.01); *G06F 21/14* (2013.01); *G06F 21/16* (2013.01); *G06F 21/51* (2013.01); *G06F 21/563* (2013.01); *G06F 2221/033* (2013.01); *G06F 2221/0733* (2013.01)

(58) Field of Classification Search
None
See application file for complete search history.

(56) References Cited

U.S. PATENT DOCUMENTS 7,421,586 B2 * 9/2008 Luo ....................... G06F 21/125
713/164
7,784,044 B2 8/2010 Buban et al.
(Continued)

FOREIGN PATENT DOCUMENTS

CN 104239757 A 12/2014
CN 104932902 A 9/2015
(Continued)

OTHER PUBLICATIONS

A Framework for Third-Party Android Markeplaces to Identify Repackaged Apps. Lo et al. IEEE. (Year: 2016).*
(Continued)

*Primary Examiner* — Venkat Perungavoor
(74) *Attorney, Agent, or Firm* — Fish & Richardson P.C.

(57) ABSTRACT

A target file is run in an installation package. A secure dynamic library is loaded in the installation package. Based on a code in the target file, digital watermark information embedded in the target file and verification information stored in the secure dynamic library is retrieved. Based on the digital watermark information and the verification information, a determination is made whether the installation package is a repackaged installation package.

18 Claims, 10 Drawing Sheets

(51) Int. Cl.
  *G06F 21/56* (2013.01)
  *G06F 8/61* (2018.01)
  *G06F 21/51* (2013.01)
  *G06F 21/14* (2013.01)
  *G06F 21/45* (2013.01)

(56) References Cited

U.S. PATENT DOCUMENTS

| | | | | |
|---|---|---|---|---|
| 8,950,007 | B1* | 2/2015 | Teal | G06F 21/554 726/30 |
| 9,374,390 | B1* | 6/2016 | Teal | G06F 21/554 |
| 2004/0172544 | A1* | 9/2004 | Luo | G06F 21/125 713/189 |
| 2006/0010430 | A1* | 1/2006 | Cousot | G06F 21/16 717/127 |
| 2006/0026430 | A1* | 2/2006 | Luo | G06F 21/14 713/176 |
| 2008/0155698 | A1* | 6/2008 | Round | G06F 21/121 726/26 |
| 2011/0241188 | A1* | 10/2011 | Mizuno | C08G 59/08 257/666 |
| 2012/0317421 | A1* | 12/2012 | Gounares | G06F 21/16 713/189 |
| 2013/0145456 | A1* | 6/2013 | Kiehtreiber | G06F 21/51 726/17 |
| 2013/0232540 | A1 | 9/2013 | Saidi et al. | |
| 2016/0026827 | A1* | 1/2016 | Ko | G06F 21/6209 713/193 |

FOREIGN PATENT DOCUMENTS

| | | |
|---|---|---|
| CN | 105205356 | 12/2015 |
| CN | 105956456 * | 9/2016 |
| CN | 106971098 A | 7/2017 |
| TW | 480439 | 3/2002 |

OTHER PUBLICATIONS

DroidEagel: Seamless Detection of Visually Similar Android Apps. Sun et al. ACM. (Year: 2015).*
Android Applications Repacking Detection Techniques for Smartphone Devices. Rastogi et al. Elsevier. (Year: 2016).*
International Search Report and Written Opinion issued in International Application No. PCT/CN2017/103403 dated Dec. 28, 2017, 14 pages (with English translation).
Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
PCT International Preliminary Report on Patentability in International Application No. PCT/CN2017/103403, dated Apr. 16, 2019, 9 pages (with English translation).
Collberg et al., "Software Watermarking: Models and Dynamic Embeddings," Proceedings of the 26th ACM SIGPLAN-SIGACT Symposium on Principles of Programming Languages, Jan. 1999, pp. 311-324.
Extended European Search Report in European Application No. 17859699.5, dated Sep. 16, 2019, 8 pages.
Jasvir et al., "A functional taxonomy for software watermarking," Australian Computer Science Communications, Jan. 2002, 24(1):177-186.
Zhou et al., "AppInk: watermarking android apps for repackaging deterrence," Proceedings of the 8th ACM SIGSAC Symposium on Information, Computer and Communications Security, Jan. 2013, 12 pages.
International Preliminary Report on Patentability in International Application No. PCT/CN2017/103403, dated Apr. 16, 2019, 9 pages (with English Translation).

* cited by examiner

METHOD AND APPARATUS FOR ANTI-REPACKAGING

CROSS-REFERENCE TO RELATED APPLICATIONS

This application is a continuation of PCT Application No. PCT/CN2017/103403, filed on Sep. 26, 2017, which claims priority to Chinese Patent Application No. 201610887188.5, filed on Oct. 11, 2016, and each application is hereby incorporated by reference in its entirety.

TECHNICAL FIELD

The present application relates to the field of computer technologies, and in particular, to a method and an apparatus for anti-repackaging.

BACKGROUND

Currently, a lot of malicious application software modifies an original installation package through repackaging, so as to embed advertisements into the original installation package, automatically download malware, and implement root programs, etc.

A repackaging process is shown in FIG. 1. First, the original installation package is decompiled to obtain a source code of the original installation package. Then, a user modifies the source code, for example, adds another code, and the added code can be an advertisement, or can be a program for automatically downloading malware, etc. Finally, a modified file is repackaged to obtain a repackaged installation package.

Because the source code is modified in the previous repackaging process, a self-signature of the repackaged installation package is no longer a self-signature of the original installation package. Thus, in the existing technologies, a method for anti-repackaging can be: checking a self-signature of an installation package to determine whether the installation package is repackaged. A specific verification process is shown in FIG. 2.

When a certain installation package is installed, a target file in the installation package is run, and a secure dynamic library in the installation package is loaded. Generally, to ensure the information security, some verification information is stored in the secure dynamic library. The verification information includes a self-signature of an original installation package corresponding to the installation package. Because an operating system provides an interface for verifying the self-signature of the installation package, after obtaining the self-signature of the installation package from the target file and obtaining the self-signature of the original installation package from the secure dynamic library, the operating system verifies whether the self-signature of the installation package is consistent with the self-signature of the original installation package. If they are consistent, the operating system determines that the installation package is the original installation package. If they are inconsistent, the operating system determines that the installation package is a repackaged installation package.

In the existing technologies, another method for anti-repackaging can be the following: An operating system calculates a hash (hash) value of an installation package installed this time, and checks the hash value, that is, compares the hash value with a hash value of an original installation package, if they are consistent, determines that the installation package is the original installation package, and if they are inconsistent, determines that the installation package is a repackaged installation package.

The two methods for anti-repackaging in the existing technologies must be used in a fully trusted operating system, so as to effectively prevent repackaging. However, because many existing operating systems are open-source, users can modify an original operating system, so that the operating system does not check a self-signature of an installation package or check a hash value of the installation package. As such, regardless of whether an installation package downloaded by the user is a repackaged installation package or not, the operating system considers by default that the installation package is an original installation package.

In addition, in the second method for anti-repackaging, sometimes an installation package to be installed occupies a large memory. As such, when the operating system calculates a hash value of the installation package, verification efficiency of the operating system is affected.

SUMMARY

The present application provides a method and an apparatus for anti-repackaging, to alleviate an existing problem that whether an installation package is repackaged cannot be effectively verified sometimes when a system checks a self-signature of the installation package, and to alleviate an existing problem that verification efficiency is low sometimes because the installation package uses a large memory when the system calculates a hash value of the installation package to check whether the installation package is repackaged.

The present application provides a method for anti-repackaging, and the method includes: running a target file in an installation package and loading a secure dynamic library in the installation package; and performing the following steps based on code in the target file: obtaining digital watermark information embedded in the target file and verification information stored in the secure dynamic library; and verifying, based on the digital watermark information and the verification information, whether the installation package is a repackaged installation package.

Correspondingly, the present application further provides an apparatus for anti-repackaging, and the apparatus includes: a running unit and an execution unit, where the running unit is configured to run a target file in an installation package and load a secure dynamic library in the installation package; and the execution unit is configured to perform the following steps based on code in the target file: obtaining digital watermark information embedded in the target file and verification information stored in the secure dynamic library; and verifying, based on the digital watermark information and the verification information, whether the installation package is a repackaged installation package.

In the method for anti-repackaging provided in the present application, the installation package includes verification code. When the installation package is installed, an operating system obtains, based on the code, the digital watermark information embedded in the target file, obtains the verification information in the secure dynamic library in the installation package, and verifies, based on the digital watermark information and the verification information, whether the installation package is a repackaged installation package. The following beneficial effects are achieved by using the method for anti-repackaging provided in the present application:

1. In the present application, the installation package includes code used to verify whether the installation package is repackaged. Thus, no matter how the operating system is modified, a process of verifying the installation package cannot be avoided. This alleviates an existing problem that whether the installation package is repackaged cannot be effectively verified because the system sometimes omits a process of verifying a self-signature of the installation package when checking the self-signature of the installation package to verify whether the installation package is repackaged.

2. In the present application, whether the installation package is repackaged is verified based on the digital watermark information and the verification information. Thus, compared with the method in existing technologies of verifying whether the installation package is repackaged by calculating a hash value of the installation package, the present application has higher efficiency in verifying whether the installation package is repackaged.

BRIEF DESCRIPTION OF DRAWINGS

The accompanying drawings described here are used to provide further understanding of the present application, and constitute a part of the present application. Schematic implementations of the present application and descriptions are used to explain the present application, and are not an improper limitation on the present application. In the accompanying drawings.

DESCRIPTION OF IMPLEMENTATIONS

To make the objectives, technical solutions, and advantages of the present application clearer, the following clearly and comprehensively describes the technical solutions of the present application with reference to specific implementations of the present application and corresponding accompanying drawings. Apparently, the described implementations are merely some rather than all of the implementations of the present application. Based on the implementations in the present application, all other implementations obtained by a person of ordinary skill in the art without creative efforts fall within the protection scope of the present application.

The following describes in detail the technical solutions provided in the implementations in the present application with reference to the accompanying drawings.

Figure 3:
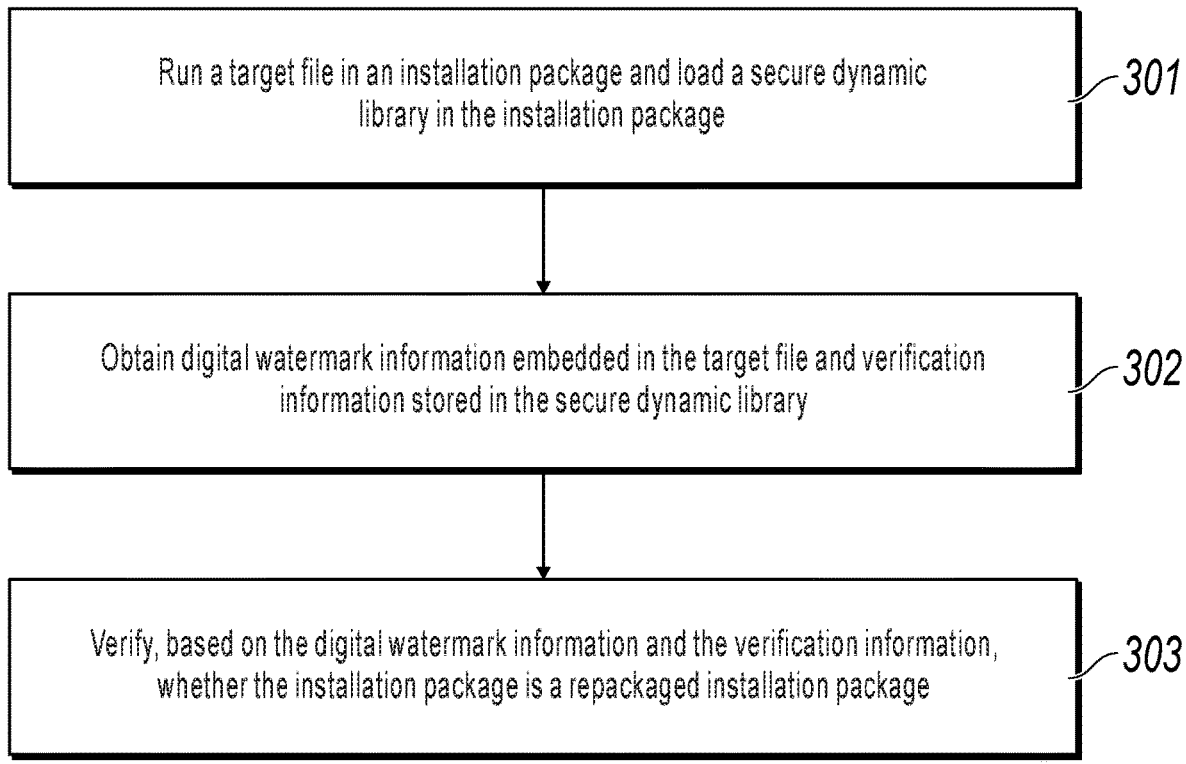
FIG. 3 is a schematic flowchart illustrating a method for anti-repackaging, according to an implementation of the present application.

The present application provides a method for anti-repackaging, to alleviate an existing problem that whether an installation package is repackaged cannot be effectively verified sometimes when a system checks a self-signature of the installation package, and to alleviate an existing problem that verification efficiency is low sometimes because the installation package occupies a large memory when the system calculates a hash value of the installation package to check whether the installation package is repackaged. A process of the method is shown in FIG. 3, and includes the following steps:

Step 301: Run a target file in an installation package and load a secure dynamic library in the installation package.

In the present step, when a user downloads a certain installation package and installs the installation package, an operating system runs a target file in the installation package, and simultaneously loads a secure dynamic library in the installation package. The target file is a target file complied based on predetermined code, and digital watermark information is embedded into the compiled target file. The digital watermark information can be a character string, an instruction, etc. The secure dynamic library stores verification information about the installation package, and the verification information is used to verify whether the installation package is a repackaged installation package.

In the previous method of embedding the digital watermark information into the target file, the digital watermark information can be embedded at the end of the target file, or the digital watermark information can be embedded at another location of the target file.

The operating system can be an ANDROID system, and the target file can be a dex file. The dex file is an executable file in the ANDROID system, and is written by using java code. The secure dynamic library can be a shared object (so) library, and is written by using c/c++. Generally, the so library stores some security information, for example, verification information. When the executable file is loaded or run, the so library is loaded by the operating system. Or the operating system can be WINDOWS, the target file can be an exe file, the secure dynamic library is a dll library, etc. The operating system, the target file, and the secure dynamic library are not limited here.

Figure 4:
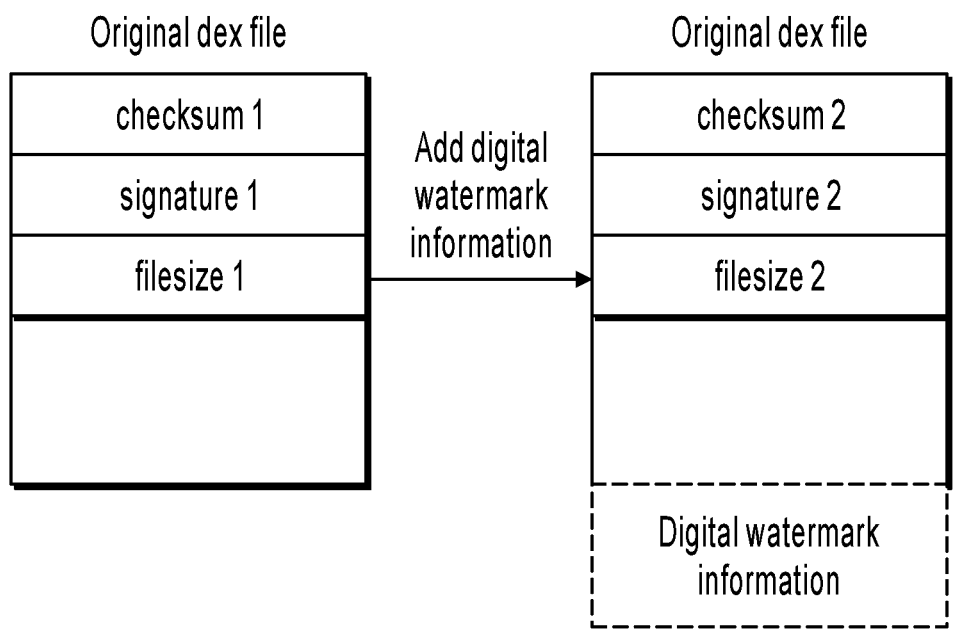
FIG. 4 is a schematic flowchart of embedding digital watermark information into a target file, according to an implementation of the present application.

As shown in FIG. 4, if the target file is a dex file, when the digital watermark information is embedded into the target file, to ensure the integrity and the accuracy of data of the target file, corresponding values such as a checksum, a signature, a file size, etc. of a target file header are recalculated based on the digital watermark information.

Figure 5:
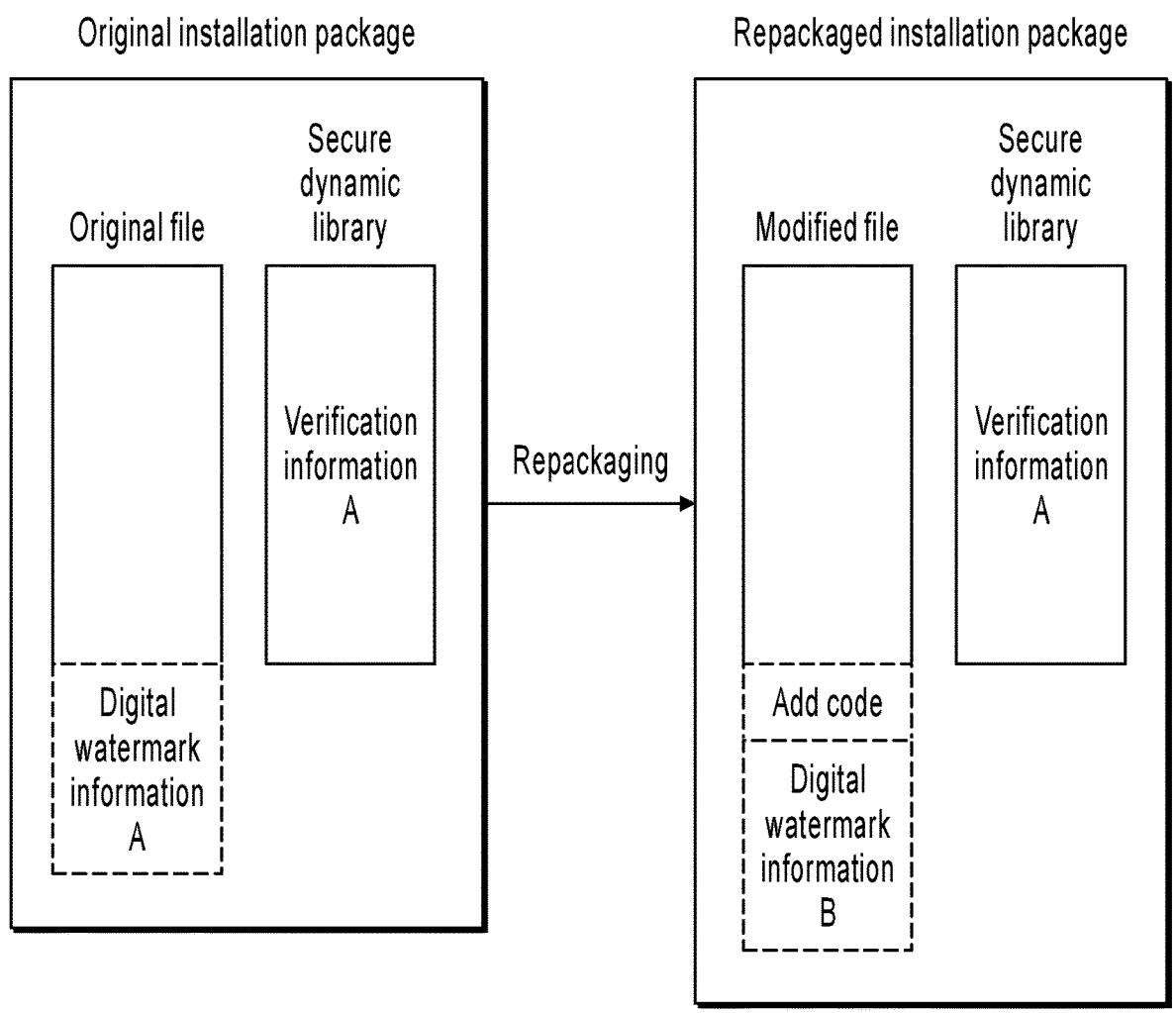
FIG. 5 is a schematic flowchart illustrating another method for anti-repackaging, according to an implementation of the present application.

It is worthwhile to note that, if the installation package is a repackaged installation package, when the user repackages an original installation package, although the user can modify code in an original file in the original installation package, verification information in a secure dynamic library of the original installation package cannot be easily modified. Thus, the secure dynamic library of the installation package still stores the verification information of the original installation package. Assume that the digital watermark information is also embedded into the original installation package, the verification information stored in the secure dynamic library can be digital watermark information embedded in the original file. A reason is shown in FIG. 5.

When the original installation package is being repackaged, the original installation package needs to be decompiled first to obtain a source code file corresponding to the original installation package. Because the digital watermark information is embedded into the original file after being compiled into the original file based on predetermined code, the digital watermark information A is lost when the original installation package is being decompiled. Then, the user can modify the source code file. As shown in FIG. 5, another code can be added. In addition, the user further embeds digital watermark information B into the source code file to forge a repackaged installation package. Finally, the source code file is repackaged and the secure dynamic library of the repackaged installation package still stores the verification information A. Thus, the digital watermark information A can be used as an identifier of the original installation package, and is used to verify whether the installation package is repackaged.

To clearly describe the implementations of the present application, the steps in the implementations of the present application are described below by embedding the digital watermark information at the end of the target file as an example.

Step 302: Perform the following steps based on code in the target file: obtaining digital watermark information embedded in the target file and verification information stored in the secure dynamic library, and verifying, based on the digital watermark information and the verification information, whether the installation package is a repackaged installation package.

Figure 6:
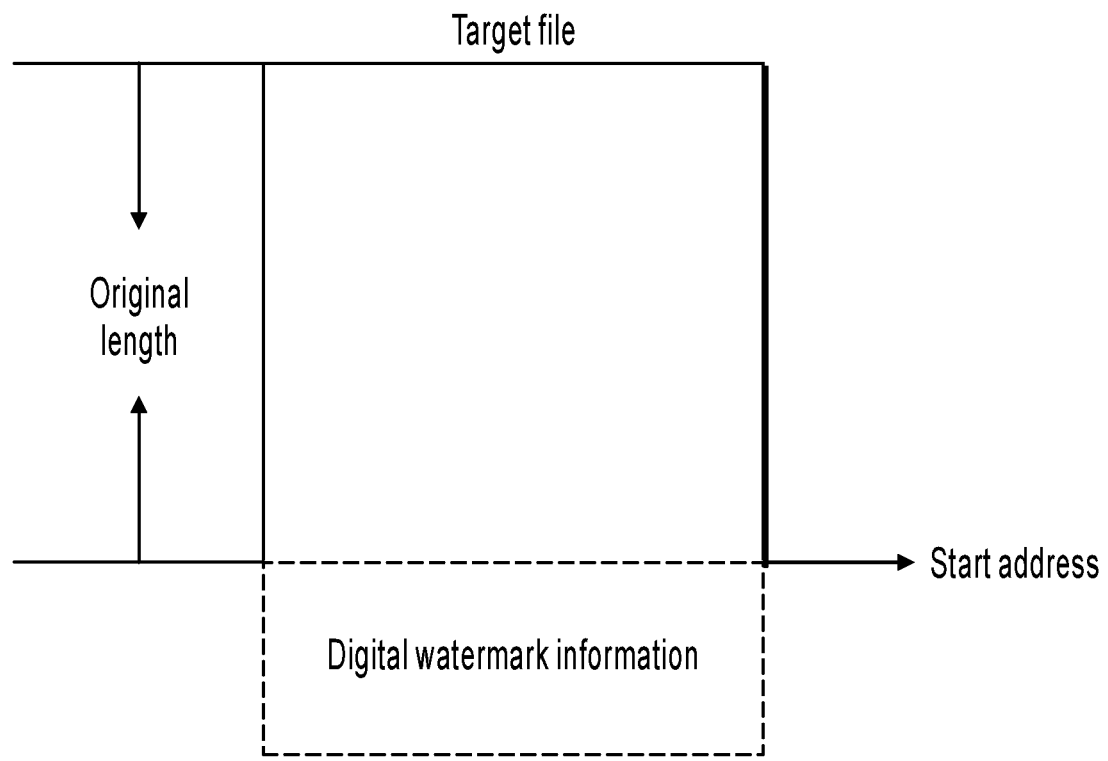
FIG. 6 is a schematic flowchart illustrating a method for identifying digital watermark information, according to an implementation of the present application.

In the present step, the operating system obtains the digital watermark information in the target file based on the code in the target file by using a method shown in FIG. 6: determining a start address of the digital watermark information in the target file based on an original length of the target file, and obtaining the digital watermark information from the target file based on the start address. The original length of the target file here is a length of the target file before the digital watermark information is embedded.

After obtaining the digital watermark information and obtaining the verification information from the secure dynamic library, the operating system verifies, based on the digital watermark information and the verification information, whether the installation package is a repackaged installation package. A verification method can be determined based on a type of the digital watermark information, as shown in Table 1:

TABLE 1

| Type of digital watermark information | Verification method |
| --- | --- |
| Character string of a fixed length | Directly verify whether the character string is consistent with verification information |
| | Verify whether a watermark value is consistent with verification information |
| Character string of a random length | Calculate a length of the random character string first, and then verify whether the character string is consistent with verification information |
| Instruction | Verify whether the instruction is consistent with verification information |
| | Verify whether an operation result is consistent with verification information |
| | Verify whether an operation result is consistent with an operation result in verification information, and verify |

TABLE 1-continued

| Type of digital watermark information | Verification method |
| --- | --- |
| | whether the instruction is consistent with an instruction in the verification information |
| ... | |

When the digital watermark information is a character string, whether the digital watermark information is consistent with the verification information is verified. If the digital watermark information is consistent with the verification information, it is determined that the installation package is an original installation package. If the digital watermark information is inconsistent with the verification information, it is determined that the installation package is a repackaged installation package.

Figure 7:
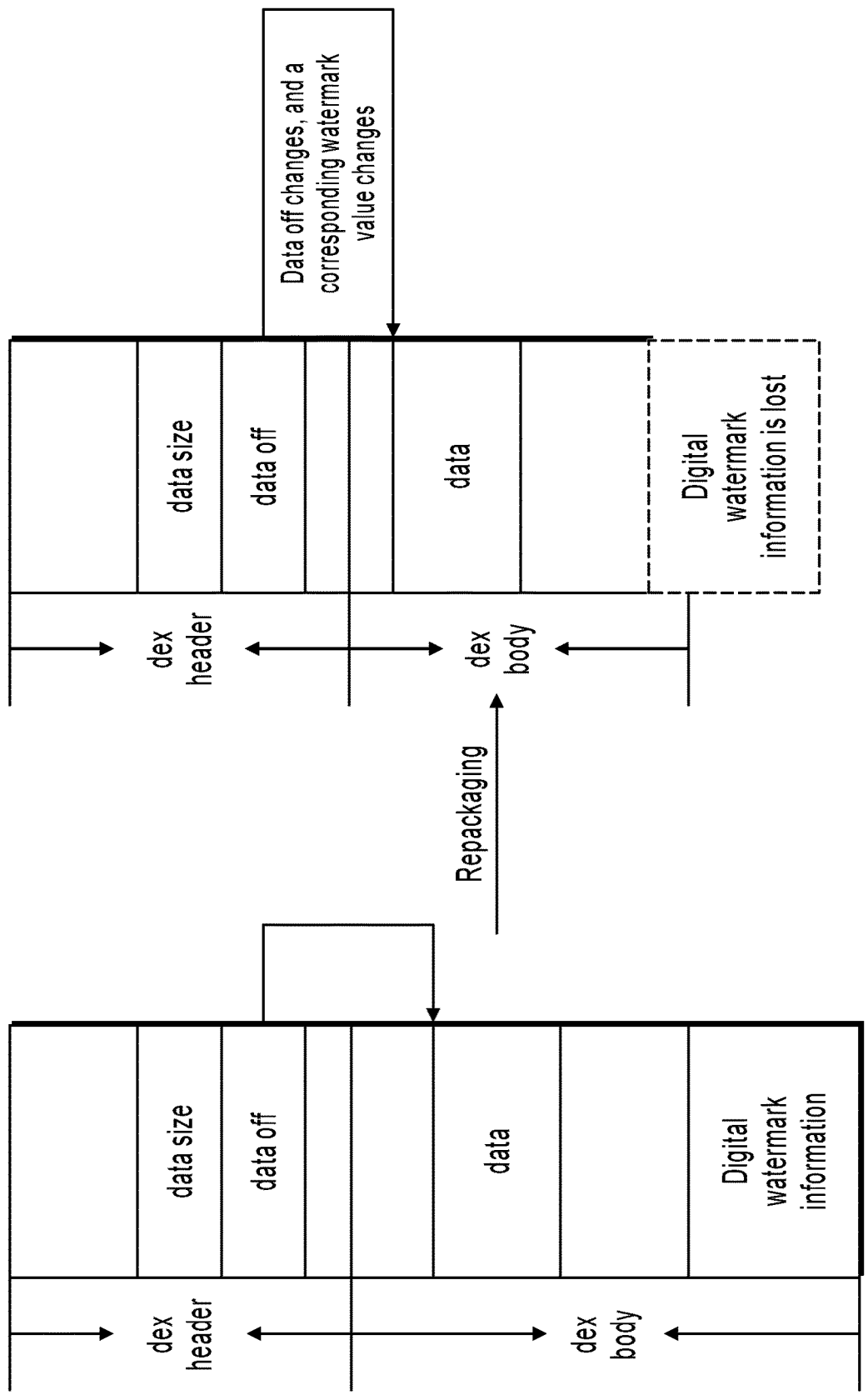
FIG. 7 is a schematic flowchart illustrating still another method for anti-repackaging, according to an implementation of the present application.

In actual applications, if the digital watermark information is a character string, the character string can be a character string of a fixed length, or can be a character string of a random length. When the digital watermark information is a character string of a fixed length, whether the character string is consistent with the verification information in the secure dynamic library is directly verified; or a watermark value corresponding to the currently downloaded installation package is calculated to determine whether the watermark value is consistent with the verification information in the secure dynamic library. FIG. 7 shows a method for verifying, by calculating a watermark value in the dex file, whether the installation package is repackaged. Details are as follows:

The dex file includes a dex header and a dex body. The dex header includes a data size and a data off, the dex body includes data, the data size indicates a size of the data, and the data off indicates an offset of the data. Assume that digital watermark information is embedded in an original dex file. When the original dex file is being repackaged, code corresponding to a data part in a dex body is modified, and after the code is modified, not only the digital watermark information embedded in the original dex file is lost, but a size of the data is also changed. Thus, a value corresponding to a data size in a dex header changes. Repackaging the original dex file can also be the following: Code corresponding to parts other than data in a dex body is modified, and after the code is modified, the digital watermark information embedded in the original dex file is also lost, and a location of the data in a dex body is offset (as shown in FIG. 7). As such, a value corresponding to data off in the dex header changes.

Assume that a method for calculating a watermark value corresponding to the original installation package is "data size+data off", that is, the watermark value is a value corresponding to the data size plus a value corresponding to the data off. When the user repackages the original installation package, the value corresponding to the data off or the data size changes, and a watermark value corresponding to the repackaged installation package also changes. At this time, the operating system can determine whether the installation package is repackaged by verifying whether the watermark value corresponding to the repackaged installation package is consistent with the verification information in the secure dynamic library. The method for calculating the watermark value here is merely an example. In actual applications, the method for calculating the watermark value can be determined based on actual situations, for example, can be "data size−data off", "data size/data off", etc.

When the previous method is used to verify whether the currently downloaded installation package is repackaged, the watermark value corresponding to the installation package changes even if the digital watermark information in the original installation package is embedded into the repackaged installation package. Thus, the operating system can accurately determine, based on the watermark value of the installation package, whether the installation package is repackaged.

When the digital watermark information is a character string of a random length, the length of the character string can be calculated first, and then, it is verified whether the length of the character string is consistent with a length of the verification information in the secure dynamic library; and if the length of the character string is inconsistent with the length of the verification information in the secure dynamic library, it is directly determined that the installation package is a repackaged installation package; or if the length of the character string is consistent with the length of the verification information in the secure dynamic library, whether the character string is consistent with the verification information in the secure dynamic library is verified, and if the character string is also consistent with the verification information in the secure dynamic library, it is determined that the installation package is an original installation package, or if the character string is inconsistent with the verification information in the secure dynamic library, it is determined that the installation package is a repackaged installation package.

When the digital watermark information is an instruction, there are a plurality of methods for verifying the installation package. Three verification methods are described below as examples:

The first method is similar to the previous method for verifying an installation package when the digital watermark information is a character string. The operating system verifies whether the instruction is consistent with the verification information in the secure dynamic library; if the instruction is consistent with the verification information in the secure dynamic library, the operating system determines that the installation package is an original installation package; and if the instruction is inconsistent with the verification information in the secure dynamic library, the operating system determines that the installation package is a repackaged installation package.

In the second method, the operating system performs a corresponding operation based on the instruction to obtain an operation result, and then verifies whether the operation result is consistent with the verification information; if the operation result is consistent with the verification information, the operating system determines that the installation package is an original installation package, and if the operation result is inconsistent with the verification information, the operating system determines that the installation package is a repackaged installation package.

For example, the instruction can be "query whether content at the XX address is consistent with the verification information in the secure dynamic library". The operating system queries content (an operation result) corresponding to the address from the XX address in the target file based on the instruction, and verifies whether the content is consistent with the verification information in the secure dynamic library. If the content is consistent with the verification information in the secure dynamic library, the operating system determines that the installation package is an original installation package. If the content is inconsistent with the verification information in the secure dynamic library, the operating system determines that the installation package is a repackaged installation package.

In the third method, the operating system performs a corresponding operation based on the instruction to obtain an operation result, verifies whether the operation result is consistent with an operation result in the verification information, and verifies whether the instruction is consistent with an instruction in the verification information. If results of both the two verifications are "consistent", the operating system determines that the installation package is an original installation package. If a result of either of the two verifications is "inconsistent", or results of both the two verifications are "inconsistent", the operating system determines that the installation package is a repackaged installation package.

To clearly describe the verification method, a simple example is provided here. Assume that the operation result in the verification information in the secure dynamic library is "2", an operation instruction is "1+1", an instruction corresponding to the digital watermark information in the target file is "3−1", and the operation result obtained after the operating system performs the operation based on the instruction is also "2". If the operating system only verifies whether the operation result is consistent with the operation result in the verification information, the operating system erroneously considers that the installation package is an original installation package, but if the operating system further verifies whether the instruction is consistent with the instruction in the verification information, the operating system accurately determines whether the installation package is repackaged.

The instruction corresponding to the digital watermark information in the target file can be a simple "return" instruction, or another instruction used for interaction with the operating system. For example, the instruction can be "make the operating system verify whether a self-signature of the target file is consistent with the verification information in the secure dynamic library". For another example, the instruction can be "make the operating system verify whether a length of the target file before the digital watermark information is embedded is consistent with the verification information stored in the secure dynamic library". The instruction can be set based on user needs.

In addition, if the installation package is a repackaged installation package, there can be the following case: Digital watermark information is embedded into an original file corresponding to the installation package. It can be seen from the previous content that, in a process of repackaging the original installation package, the digital watermark information in the original installation package is lost. If the user does not add digital watermark information after modifying code of the original file, the operating system can query, based on the code in the installation package, whether the target file of the installation package includes the digital watermark information.

The previous method for verifying an installation package is merely an example. In actual applications, there are a plurality of types of digital watermark information, and also a plurality of corresponding verification methods, which are not limited here.

Figure 8:
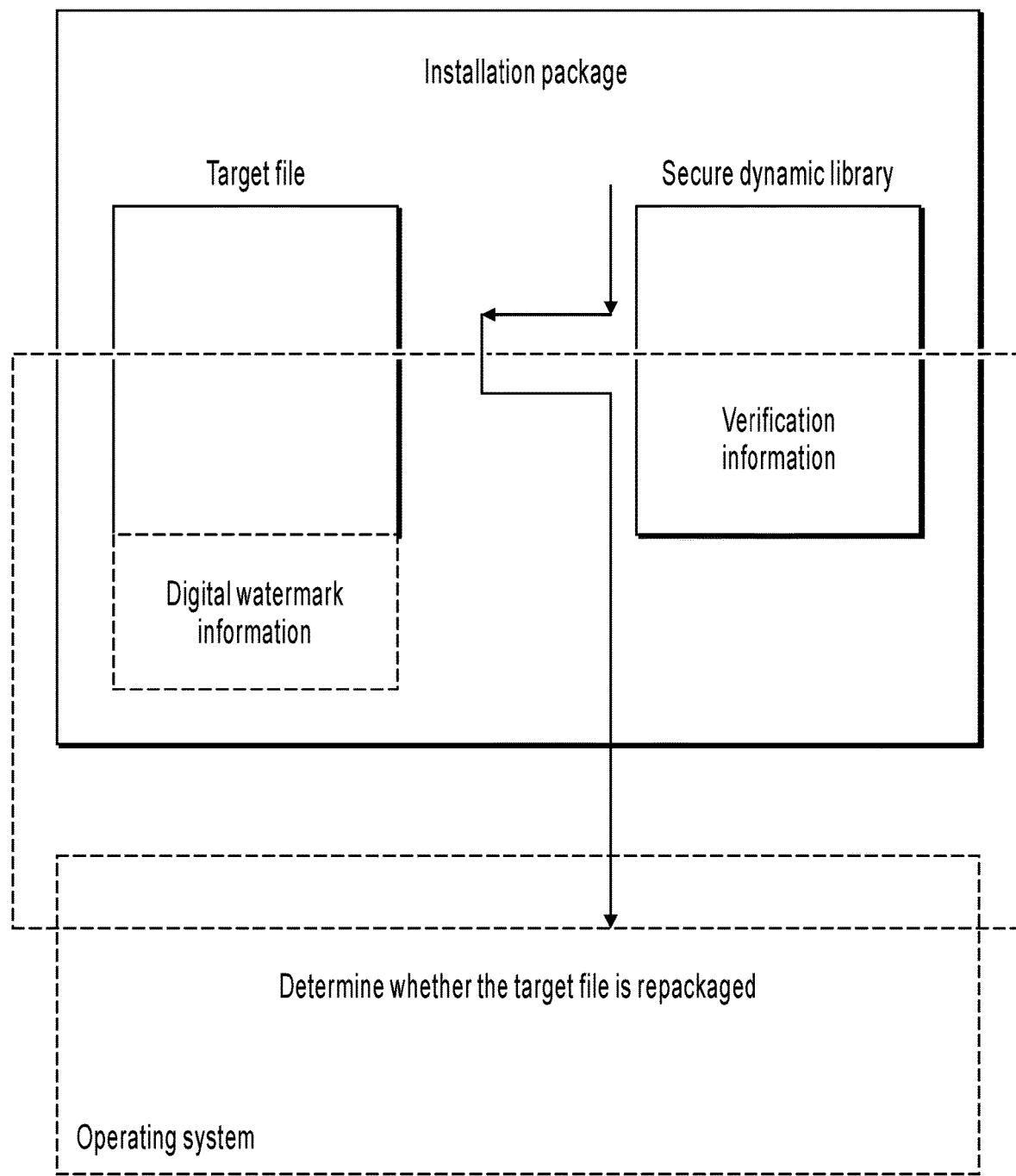
FIG. 8 is a schematic flowchart illustrating yet another method for anti-repackaging, according to an implementation of the present application.

In the method for anti-repackaging provided in the present application, the installation package includes verification code. When the installation package is installed, as shown in FIG. 8, the operating system obtains, based on the code, the verification information in the secure dynamic library in the installation package, obtains the digital watermark information embedded in the target file, and verifies, based on the digital watermark information and the verification information, whether the installation package is a repackaged installation package. The following beneficial effects are achieved by using the method for anti-repackaging provided in the present application:

1. In the present application, the installation package includes code used to verify whether the installation package is repackaged. Thus, no matter how the operating system is modified, a process of verifying the installation package cannot be avoided. This alleviates an existing problem that whether the installation package is repackaged cannot be effectively verified because the system sometimes omits a process of verifying a self-signature of the installation package when checking the self-signature of the installation package to verify whether the installation package is repackaged.

2. In the present application, whether the installation package is repackaged is verified based on the digital watermark information and the verification information. Thus, compared with the method in existing technologies of verifying whether the installation package is repackaged by calculating a hash value of the installation package, the present application has higher efficiency in verifying whether the installation package is repackaged.

Figure 9:
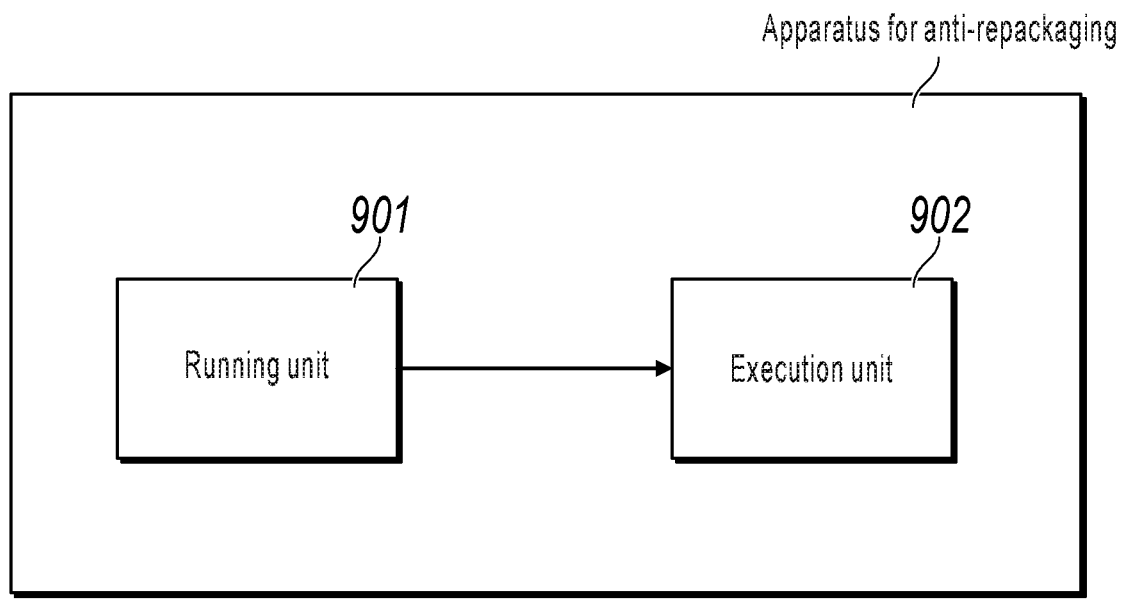
FIG. 9 is a schematic structural diagram illustrating an apparatus for anti-repackaging, according to an implementation of the present application.

Correspondingly, the present application further provides an apparatus for anti-repackaging, to alleviate an existing problem that whether an installation package is repackaged cannot be effectively verified sometimes when a system checks a self-signature of the installation package, and to alleviate an existing problem that verification efficiency is low sometimes because the installation package occupies a large memory when the system calculates a hash value of the installation package to check whether the installation package is repackaged. A structure of the apparatus is shown in FIG. 9, and includes the following units: a running unit 901 and an execution unit 902.

The running unit 901 is configured to run a target file in an installation package and load a secure dynamic library in the installation package.

The execution unit 902 is configured to perform the following steps based on code in the target file: obtaining digital watermark information embedded in the target file and verification information stored in the secure dynamic library; and verifying, based on the digital watermark information and the verification information, whether the installation package is a repackaged installation package.

A working flow of the present apparatus implementation is as follows: First, the running unit 901 runs the target file in the installation package and loads the secure dynamic library in the installation package; and then the execution unit 902 performs the following steps based on the code in the target file: obtaining the digital watermark information embedded in the target file and the verification information stored in the secure dynamic library; and verifying, based on the digital watermark information and the verification information, whether the installation package is a repackaged installation package.

In the present apparatus implementation, anti-repackaging is implemented by using many methods. For example, in a first implementation, the target file is a target file obtained after predetermined code is complied, and the digital watermark information is embedded at the end of the compiled target file.

In a second implementation, the obtaining digital watermark information embedded in the target file includes: determining a start address of the digital watermark information in the target file based on an original length of the target file, where the original length is a length of the target file before the digital watermark information is embedded; and obtaining the digital watermark information from the target file based on the start address.

In a third implementation, the verifying, based on the digital watermark information and the verification information, whether the installation package is a repackaged installation package includes: verifying whether the digital watermark information is consistent with the verification information; and if the digital watermark information is consistent with the verification information, determining that the installation package is an original installation package; or if the digital watermark information is inconsistent with the verification information, determining that the installation package is a repackaged installation package.

In a fourth implementation, the verifying, based on the digital watermark information and the verification information, whether the installation package is a repackaged installation package includes: when the digital watermark information is an instruction, performing an operation based on the instruction to obtain an operation result; verifying whether the operation result is consistent with the verification information; and if the operation result is consistent with the verification information, determining that the installation package is an original installation package; or if the operation result is inconsistent with the verification information, determining that the installation package is a repackaged installation package.

In a fifth implementation, the verifying, based on the digital watermark information and the verification information, whether the installation package is a repackaged installation package includes: when the digital watermark information is an instruction, performing an operation based on the instruction to obtain an operation result; verifying whether the operation result is consistent with an operation result in the verification information, and verifying whether the instruction is consistent with an instruction in the verification information; and if the operation result is consistent with the operation result in the verification information and the instruction is consistent with the instruction in the verification information, determining that the installation package is an original installation package; or otherwise, determining that the installation package is a repackaged installation package.

Beneficial effects achieved in the present apparatus implementation are the same as or similar to the beneficial effects achieved in the previous method implementation. To avoid repetition, details are omitted here for simplicity.

A person skilled in the art should understand that the implementations of the present invention can be provided as a method, a system, or a computer program product. Therefore, the present invention can take the form of hardware only implementations, software only implementations, or implementations combining software and hardware. In addition, the present invention can take the form of a computer program product that is implemented on one or more computer-usable storage media (including but not limited to a disk memory, a CD-ROM, an optical memory, etc.) that include computer-usable program code.

The present invention is described with reference to a flowchart and/or block diagram of a method, a device (system), and a computer program product according to an implementation of the present invention. It should be understood that computer program instructions can be used to implement each process and/or each block in the flowcharts and/or the block diagrams and a combination of a process and/or a block in the flowcharts and/or the block diagrams.

These computer program instructions can be provided for a general purpose computer, a dedicated computer, an embedded processor, or a processor of any other programmable data processing device to generate a machine, so that the instructions executed by a computer or a processor of any other programmable data processing device generate a device for implementing a specific function in one or more processes in the flowcharts and/or in one or more blocks in the block diagrams.

These computer program instructions can be stored in a computer readable memory that can instruct the computer or any other programmable data processing device to work by using a specific method, so that the instructions stored in the computer readable memory generate an artifact that includes an instruction device. The instruction device implements a specific function in one or more processes in the flowcharts and/or in one or more blocks in the block diagrams.

These computer program instructions can be loaded to a computer or another programmable data processing device, so that a series of operations and steps are performed on the computer or other programmable device, thereby generating computer-implemented processing. Therefore, the instructions executed on the computer or the other programmable device provide steps for implementing a specific function in one or more processes in the flowcharts and/or in one or more blocks in the block diagrams.

In a typical configuration, the computing device includes one or more central processing units (CPU), one or more input/output interfaces, one or more network interfaces, and one or more memories.

The memory can include a volatile memory in a computer readable medium, a random access memory (RAM), and/or a non-volatile memory, etc., such as a read-only memory (ROM) or a flash memory (flash RAM). The memory is an example of a computer readable medium.

The computer readable medium includes permanent and non-permanent, removable and non-removable media that can store information by using any method or technology. The information can be a computer readable instruction, a data structure, a module of a program, or other data. Examples of computer storage media include but are not limited to a phase-random change memory (PRAM), a static random access memory (SRAM), a dynamic random access memory (DRAM), another type of random access memory (RAM), a read-only memory (ROM), an electrically erasable programmable read-only memory (EEPROM), a flash memory or another memory technology, a compact disc read-only memory (CD-ROM), a digital versatile disc (DVD) or another optical storage, a magnetic cassette tape, a magnetic tape/disk storage, or another magnetic storage device or any other non-transmission medium, and can be used to store information that can be accessed by a computing device. As defined in the present specification, the computer readable medium does not include transitory computer readable media (transitory media), such as a modulated data signal and carrier.

It is worthwhile to further note that the term "include", "contain", or their any other variant is intended to cover a non-exclusive inclusion, so that a process, a method, merchandise, or a device that includes a list of elements not only includes those elements but also includes other elements which are not expressly listed, or further includes elements inherent to such process, method, merchandise, or device. An element preceded by "includes a . . . " does not, without more constraints, preclude the existence of additional identical elements in the process, method, merchandise, or device that includes the element.

A person skilled in the art should understand that the implementations of the present specification can be provided as a method, a system, or a computer program product. Therefore, the present application can take the form of hardware only implementations, software only implementations, or implementations combining software and hardware. In addition, the present application can take the form of a computer program product that is implemented on one or more computer-usable storage media (including but not limited to a disk memory, a CD-ROM, an optical memory, etc.) that include computer-usable program code.

The previous descriptions are merely implementations of the present application, and are not intended to limit the present application. For those skilled in the art, there can be various changes and changes in the present application. Any modification, equivalent replacement, improvement, etc. made within the spirit and principle of the present application shall fall within the scope of the claims of the present application.

Figure 10:
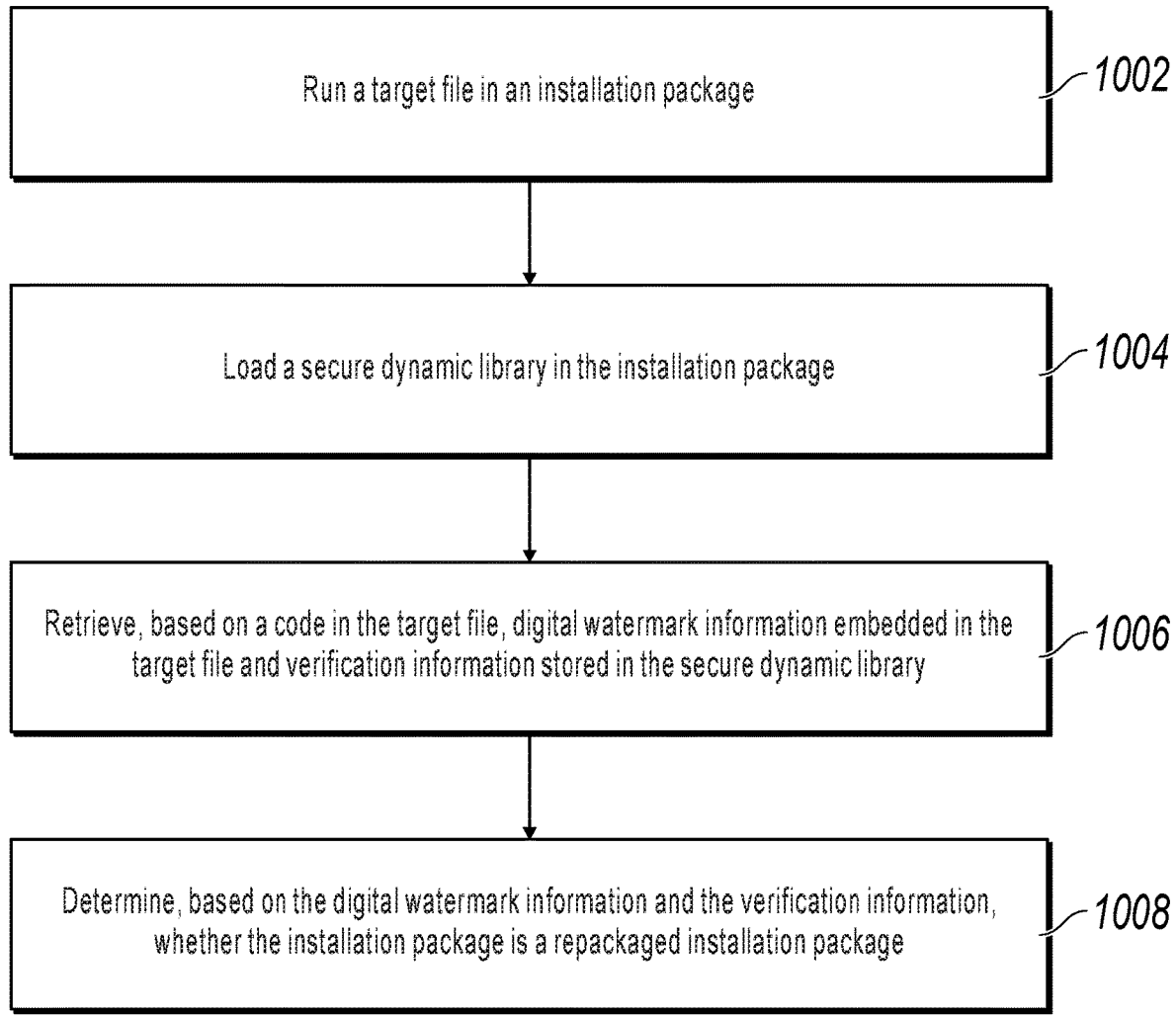
FIG. 10 is a flowchart illustrating an example of a computer-implemented method for anti-repackaging, according to an implementation of the present disclosure.

FIG. 10 is a flowchart illustrating an example of a computer-implemented method 1000 for anti-repackaging, according to an implementation of the present disclosure. For clarity of presentation, the description that follows generally describes method 1000 in the context of the other figures in this description. However, it will be understood that method 1000 can be performed, for example, by any system, environment, software, and hardware, or a combination of systems, environments, software, and hardware, as appropriate. In some implementations, various steps of method 1000 can be run in parallel, in combination, in loops, or in any order.

At 1002, a target file is run in an installation package. From 1002, method 1000 proceeds to 1004.

At 1004, a secure dynamic library is loaded in the installation package. From 1004, method 1000 proceeds to 1006.

At 1006, based on a code in the target file, digital watermark information embedded in the target file and verification information stored in the secure dynamic library is retrieved. In some implementations, the target file is a target file obtained after predetermined code is compiled and the digital watermark information is embedded at an end of the target file. In some implementations, retrieving the digital watermark information includes determining a start address of the digital watermark information in the target file based on an original length of the target file, where the original length is a length of the target file before the digital watermark information is embedded, and the digital watermark information is retrieved from the target file based on the start address. From 1006, method 1000 proceeds to 1008.

At 1008, based on the digital watermark information and the verification information, a determination is made whether the installation package is a repackaged installation package.

In some implementations, determining whether the installation package is the repackaged installation package comprises determining whether the digital watermark information is consistent with the verification information. In response to determining that the digital watermark information is consistent with the verification information: 1) determining that the installation package is an original installation package; and 2) in response to determining that the digital watermark information is inconsistent with the verification information: determining that the installation package is a repackaged installation package.

In some implementations, determining, based on the digital watermark information and the verification information, whether the installation package is the repackaged installation package comprises: 1) when the digital watermark information is an instruction, performing an operation based on the instruction to obtain an operation result; 2) determining whether the operation result is consistent with the verification information; 3) in response to determining that the operation result is consistent with the verification information, determining that the installation package is an original installation package; and 4) in response to determining that the operation result is inconsistent with the verification information, determining that the installation package is a repackaged installation package.

In some implementations, determining, based on the digital watermark information and the verification information, whether the installation package is the repackaged installation package comprises: 1) when the digital watermark information is an instruction, performing an operation based on the instruction to obtain an operation result and 2) determining whether the operation result is consistent with an operation result in the verification information, and determining whether the instruction is consistent with an instruction in the verification information. In some implementations, in response to determining that the operation result is consistent with the operation result in the verification information and the instruction is consistent with the instruction in the verification information: 1) determining that the installation package is an original installation package and 2) in response to determining that the operation result is inconsistent with the verification information, determining that the installation package is the repackaged installation package. After 1008, method 1000 can stop.

Figure 1:
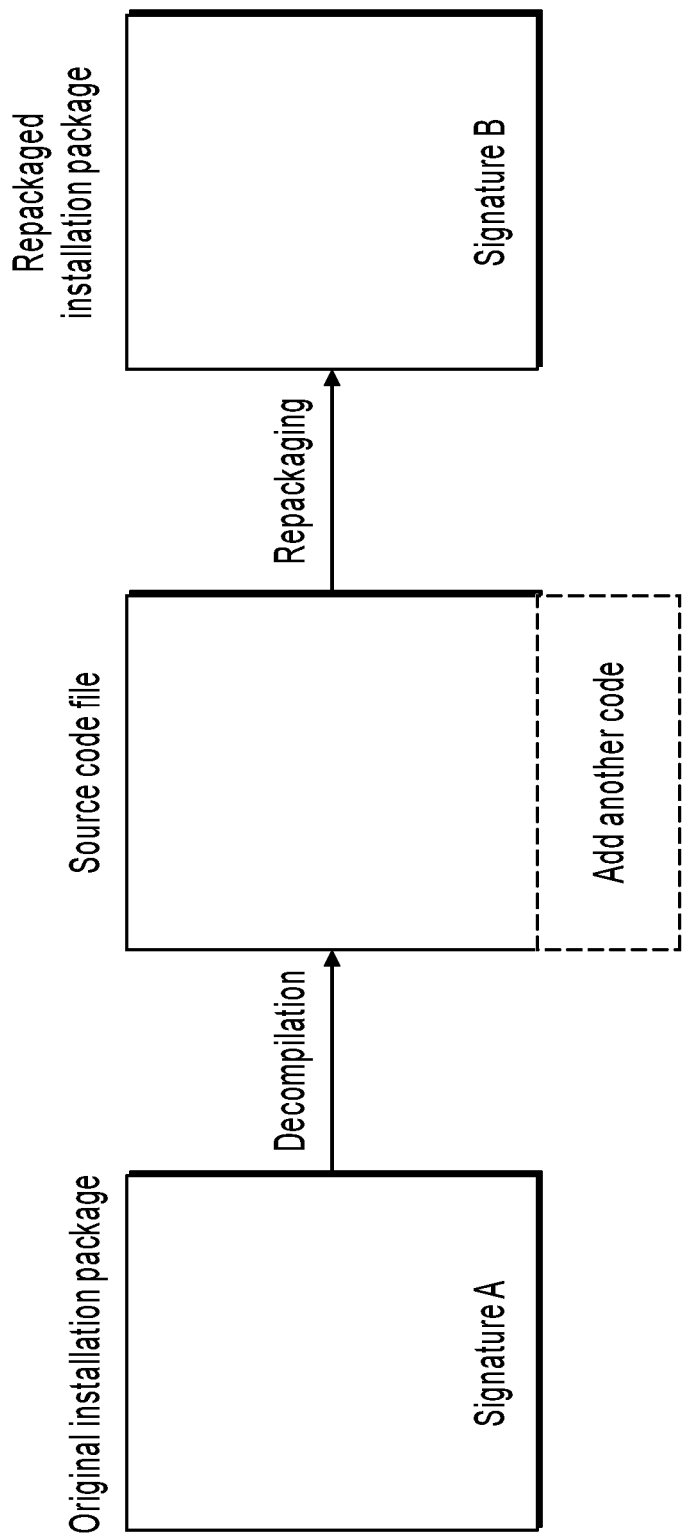
FIG. 1 is a schematic flowchart illustrating a repackaging method in existing technologies.
Figure 2:
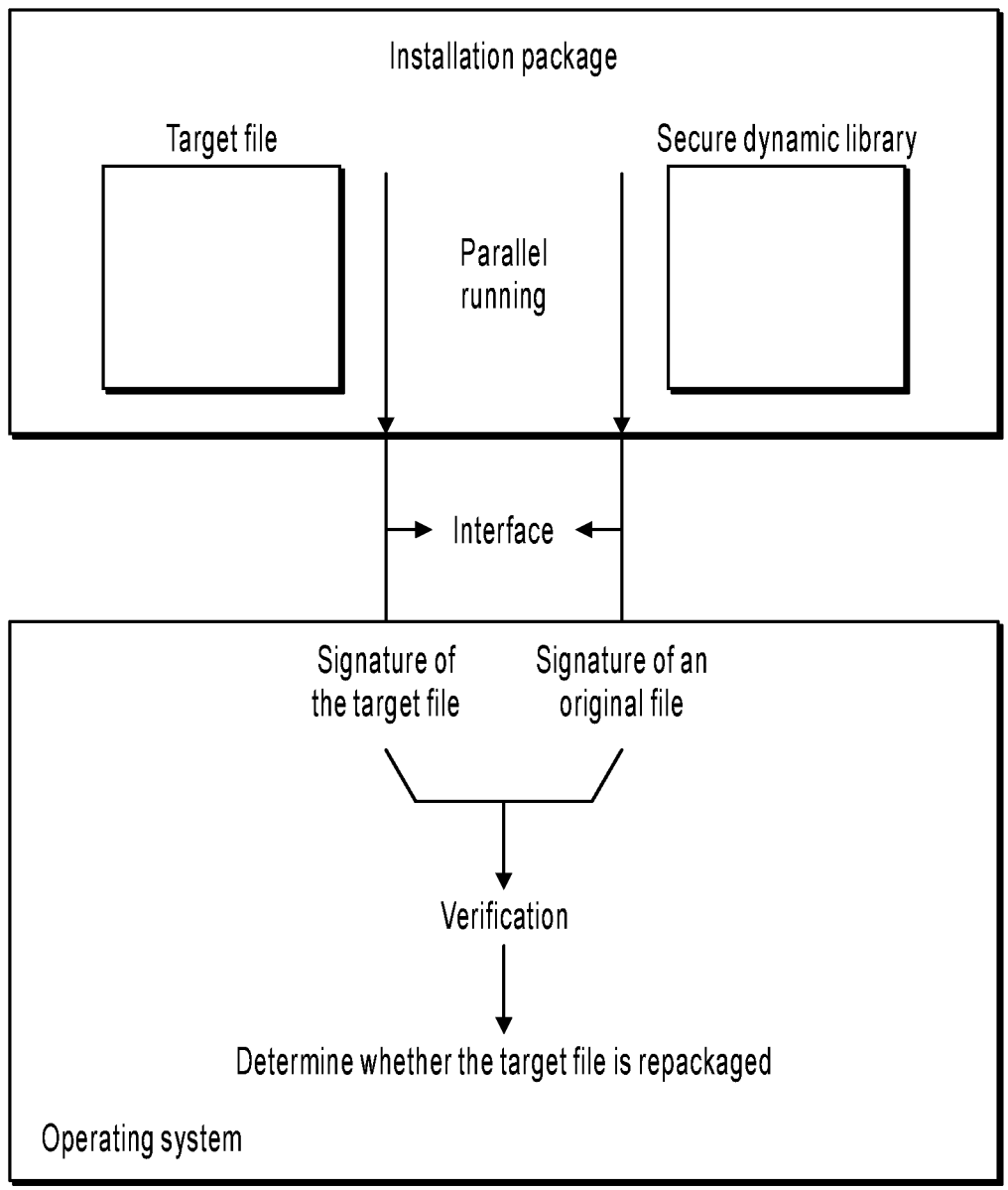
FIG. 2 is a schematic flowchart illustrating a method for anti-repackaging in existing technologies.

The described methodology describes one or more technical effects and subject matter. Malicious application software can modify an original installation package through repackaging, so as to, for example, embed advertisements into the original installation package, automatically download malware, and implement root programs. As previously described with respect to FIG. 1, an original installation package is decompiled to obtain a source code of the original installation package. Then, a user modifies the source code (for example, adds an advertisement or malware downloader/installer). Finally, a modified file is repackaged to obtain a repackaged installation package. Because the source code is modified in the previous repackaging process, a self-signature of the repackaged installation package is no longer a self-signature of the original installation package. Described methods of anti-repackaging protect information security, integrity, and accuracy while executing on non-fully trusted operating systems and without requiring an excessive amount of computing resources (for example, processing and memory).

An apparatus can also be provided to perform the described anti-repackaging methodology. The use of the apparatus can alleviate an identified issue that whether an installation package is repackaged cannot always be effectively verified when a system checks a self-signature of the installation package, and to alleviate an identified issue that verification efficiency is sometimes low because the installation package can occupy a large amount of computing memory when the system calculates a hash value of the installation package to check whether the installation package is repackaged.

Embodiments and the operations described in this specification can be implemented in digital electronic circuitry, or in computer software, firmware, or hardware, including the structures disclosed in this specification or in combinations of one or more of them. The operations can be implemented as operations performed by a data processing apparatus on data stored on one or more computer-readable storage devices or received from other sources. A data processing apparatus, computer, or computing device may encompass apparatus, devices, and machines for processing data, including by way of example a programmable processor, a computer, a system on a chip, or multiple ones, or combinations, of the foregoing. The apparatus can include special purpose logic circuitry, for example, a central processing unit (CPU), a field programmable gate array (FPGA) or an application-specific integrated circuit (ASIC). The apparatus can also include code that creates an execution environment for the computer program in question, for example, code that constitutes processor firmware, a protocol stack, a database management system, an operating system (for example an operating system or a combination of operating systems), a cross-platform runtime environment, a virtual machine, or a combination of one or more of them. The apparatus and execution environment can realize various different computing model infrastructures, such as web services, distributed computing and grid computing infrastructures.

A computer program (also known, for example, as a program, software, software application, software module, software unit, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A program can be stored in a portion of a file that holds other programs or data (for example, one or more scripts stored in a markup language document), in a single file dedicated to the program in question, or in multiple coordinated files (for example, files that store one or more modules, sub-programs, or portions of code). A computer program can be executed on one computer or on multiple computers that are located at one site or distributed across multiple sites and interconnected by a communication network.

Processors for execution of a computer program include, by way of example, both general- and special-purpose microprocessors, and any one or more processors of any kind of digital computer. Generally, a processor will receive instructions and data from a read-only memory or a random-access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data. A computer can be embedded in another device, for example, a mobile device, a personal digital assistant (PDA), a game console, a Global Positioning System (GPS) receiver, or a portable storage device. Devices suitable for storing computer program instructions and data include non-volatile memory, media and memory devices, including, by way of example, semiconductor memory devices, magnetic disks, and magneto-optical disks. The processor and the memory can be supplemented by, or incorporated in, special-purpose logic circuitry.

Mobile devices can include handsets, user equipment (UE), mobile telephones (for example, smartphones), tablets, wearable devices (for example, smart watches and smart eyeglasses), implanted devices within the human body (for example, biosensors, cochlear implants), or other types of mobile devices. The mobile devices can communicate wirelessly (for example, using radio frequency (RF) signals) to various communication networks (described below). The mobile devices can include sensors for determining characteristics of the mobile device's current environment. The sensors can include cameras, microphones, proximity sensors, GPS sensors, motion sensors, accelerometers, ambient light sensors, moisture sensors, gyroscopes, compasses, barometers, fingerprint sensors, facial recognition systems, RF sensors (for example, Wi-Fi and cellular radios), thermal sensors, or other types of sensors. For example, the cameras can include a forward- or rear-facing camera with movable or fixed lenses, a flash, an image sensor, and an image processor. The camera can be a megapixel camera capable of capturing details for facial and/or iris recognition. The camera along with a data processor and authentication information stored in memory or accessed remotely can form a facial recognition system. The facial recognition system or one-or-more sensors, for example, microphones, motion sensors, accelerometers, GPS sensors, or RF sensors, can be used for user authentication.

To provide for interaction with a user, embodiments can be implemented on a computer having a display device and an input device, for example, a liquid crystal display (LCD) or organic light-emitting diode (OLED)/virtual-reality (VR)/ augmented-reality (AR) display for displaying information to the user and a touchscreen, keyboard, and a pointing device by which the user can provide input to the computer. Other kinds of devices can be used to provide for interaction with a user as well; for example, feedback provided to the user can be any form of sensory feedback, for example, visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments can be implemented using computing devices interconnected by any form or medium of wireline or wireless digital data communication (or combination thereof), for example, a communication network. Examples of interconnected devices are a client and a server generally remote from each other that typically interact through a communication network. A client, for example, a mobile device, can carry out transactions itself, with a server, or through a server, for example, performing buy, sell, pay, give, send, or loan transactions, or authorizing the same. Such transactions may be in real time such that an action and a response are temporally proximate; for example an individual perceives the action and the response occurring substantially simultaneously, the time difference for a response following the individual's action is less than 1 millisecond (ms) or less than 1 second (s), or the response is without intentional delay taking into account processing limitations of the system.

Examples of communication networks include a local area network (LAN), a radio access network (RAN), a metropolitan area network (MAN), and a wide area network (WAN). The communication network can include all or a portion of the Internet, another communication network, or a combination of communication networks. Information can be transmitted on the communication network according to various protocols and standards, including Long Term Evolution (LTE), 5G, IEEE 802, Internet Protocol (IP), or other protocols or combinations of protocols. The communication network can transmit voice, video, biometric, or authentication data, or other information between the connected computing devices.

Features described as separate implementations may be implemented, in combination, in a single implementation, while features described as a single implementation may be implemented in multiple implementations, separately, or in any suitable sub-combination. Operations described and claimed in a particular order should not be understood as requiring that the particular order, nor that all illustrated operations must be performed (some operations can be optional). As appropriate, multitasking or parallel-processing (or a combination of multitasking and parallel-processing) can be performed.

What is claimed is:

1. A computer-implemented method for anti-repackaging, comprising:
    running a target file in an installation package;
    loading a secure dynamic library in the installation package;
    retrieving, based on a code in the target file, digital watermark information embedded in the target file and verification information stored in the secure dynamic library; and
    determining, based on the digital watermark information and the verification information, whether the installation package is a repackaged installation package, comprising:
        when the digital watermark information is an instruction:
            performing an operation based on the instruction to obtain an operation result;
            determining whether the operation result is consistent with an operation result in the verification information; and
            determining whether the instruction is consistent with an instruction in the verification information.

2. The computer-implemented method of claim 1, wherein:
    the target file is a target file obtained after predetermined code is compiled; and
    the digital watermark information is embedded at an end of the target file.

3. The computer-implemented method of claim 2, wherein retrieving the digital watermark information comprises:
    determining a start address of the digital watermark information in the target file based on an original length of the target file, wherein the original length is a length of the target file before the digital watermark information is embedded; and
    retrieving the digital watermark information from the target file based on the start address.

4. The computer-implemented method of claim 1, wherein determining, based on the digital watermark information and the verification information, whether the installation package is the repackaged installation package further comprises, or:
    determining whether the digital watermark information is consistent with the verification information;
    in response to determining that the digital watermark information is consistent with the verification information:
        determining that the installation package is an original installation package; and
    in response to determining that the digital watermark information is inconsistent with the verification information:
        determining that the installation package is a repackaged installation package.

5. The computer-implemented method of claim 1, wherein determining, based on the digital watermark information and the verification information, whether the installation package is the repackaged installation package further comprises:
  or, when the digital watermark information is an instruction:
    performing an operation based on the instruction to obtain an operation result;
    determining whether the operation result is consistent with the verification information;
    in response to determining that the operation result is consistent with the verification information:
      determining that the installation package is an original installation package; and
    in response to determining that the operation result is inconsistent with the verification information:
      determining that the installation package is a repackaged installation package.

6. The computer-implemented method of claim 1, further comprising:
  in response to determining that the operation result is consistent with the operation result in the verification information and the instruction is consistent with the instruction in the verification information:
    determining that the installation package is an original installation package; and
  in response to determining that the operation result is inconsistent with the verification information:
    determining that the installation package is the repackaged installation package.

7. A non-transitory, computer-readable medium storing one or more instructions executable by a computer system to perform operations for anti-repackaging, comprising:
  running a target file in an installation package;
  loading a secure dynamic library in the installation package;
  retrieving, based on a code in the target file, digital watermark information embedded in the target file and verification information stored in the secure dynamic library; and
  determining, based on the digital watermark information and the verification information, whether the installation package is a repackaged installation package, comprising:
    when the digital watermark information is an instruction:
      performing an operation based on the instruction to obtain an operation result;
      determining whether the operation result is consistent with an operation result in the verification information; and
      determining whether the instruction is consistent with an instruction in the verification information.

8. The non-transitory, computer-readable medium of claim 7, wherein:
  the target file is a target file obtained after predetermined code is compiled; and
  the digital watermark information is embedded at an end of the target file.

9. The non-transitory, computer-readable medium of claim 8, wherein retrieving the digital watermark information comprises:
  determining a start address of the digital watermark information in the target file based on an original length of the target file, wherein the original length is a length of the target file before the digital watermark information is embedded; and
  retrieving the digital watermark information from the target file based on the start address.

10. The non-transitory, computer-readable medium of claim 7, wherein determining, based on the digital watermark information and the verification information, whether the installation package is the repackaged installation package further comprises, or:
  determining whether the digital watermark information is consistent with the verification information;
  in response to determining that the digital watermark information is consistent with the verification information:
    determining that the installation package is an original installation package; and
  in response to determining that the digital watermark information is inconsistent with the verification information:
    determining that the installation package is a repackaged installation package.

11. The non-transitory, computer-readable medium of claim 7, wherein determining, based on the digital watermark information and the verification information, whether the installation package is the repackaged installation package further comprises:
  or, when the digital watermark information is an instruction:
    performing an operation based on the instruction to obtain an operation result;
    determining whether the operation result is consistent with the verification information;
    in response to determining that the operation result is consistent with the verification information:
      determining that the installation package is an original installation package; and
    in response to determining that the operation result is inconsistent with the verification information:
      determining that the installation package is a repackaged installation package.

12. The non-transitory, computer-readable medium of claim 7, further comprising:
  in response to determining that the operation result is consistent with the operation result in the verification information and the instruction is consistent with the instruction in the verification information:
    determining that the installation package is an original installation package; and
  in response to determining that the operation result is inconsistent with the verification information:
    determining that the installation package is the repackaged installation package.

13. A computer-implemented system for anti-repackaging, comprising:
  one or more computers; and
  one or more computer memory devices interoperably coupled with the one or more computers and having tangible, non-transitory, machine-readable media storing one or more instructions that, when executed by the one or more computers, perform one or more operations comprising:
    running a target file in an installation package;
    loading a secure dynamic library in the installation package;

retrieving, based on a code in the target file, digital watermark information embedded in the target file and verification information stored in the secure dynamic library; and determining, based on the digital watermark information and the verification information, whether the installation package is a repackaged installation package, comprising:

when the digital watermark information is an instruction:

performing an operation based on the instruction to obtain an operation result;

determining whether the operation result is consistent with an operation result in the verification information; and determining whether the instruction is consistent with an instruction in the verification information.

14. The computer-implemented system of claim 13, wherein:

the target file is a target file obtained after predetermined code is compiled; and the digital watermark information is embedded at an end of the target file.

15. The computer-implemented system of claim 14, wherein retrieving the digital watermark information comprises:

determining a start address of the digital watermark information in the target file based on an original length of the target file, wherein the original length is a length of the target file before the digital watermark information is embedded; and retrieving the digital watermark information from the target file based on the start address.

16. The computer-implemented system of claim 13, wherein determining, based on the digital watermark information and the verification information, whether the installation package is the repackaged installation package further comprises, or:

determining whether the digital watermark information is consistent with the verification information;

in response to determining that the digital watermark information is consistent with the verification information:

determining that the installation package is an original installation package; and in response to determining that the digital watermark information is inconsistent with the verification information:

determining that the installation package is a repackaged installation package.

17. The computer-implemented system of claim 13, wherein determining, based on the digital watermark information and the verification information, whether the installation package is the repackaged installation package comprises:

when the digital watermark information is an instruction:

performing an operation based on the instruction to obtain an operation result;

determining whether the operation result is consistent with the verification information;

in response to determining that the operation result is consistent with the verification information:

determining that the installation package is an original installation package; and in response to determining that the operation result is inconsistent with the verification information:

determining that the installation package is a repackaged installation package.

18. The computer-implemented system of claim 13, further comprising:

in response to determining that the operation result is consistent with the operation result in the verification information and the instruction is consistent with the instruction in the verification information:

determining that the installation package is an original installation package; and in response to determining that the operation result is inconsistent with the verification information:

determining that the installation package is the repackaged installation package.

* * * * *